(12) United States Patent
Kim et al.

(10) Patent No.: US 10,063,182 B2
(45) Date of Patent: Aug. 28, 2018

(54) HYBRID POWER GENERATING DEVICE

(71) Applicant: RESEARCH & BUSINESS FOUNDATION SUNGKYUNKWAN UNIVERSITY, Suwon-si (KR)

(72) Inventors: Sangwoo Kim, Yongin-si (KR); Gyu-cheol Yoon, Suwon-si (KR); Keun Young Lee, Suwon-si (KR); Kyung Sik Shin, Gumi-si (KR); Seongsu Kim, Seoul (KR)

(73) Assignee: Research & Business Foundation Sungkyunkwan University, Suwon-si (KR)

( * ) Notice: Subject to any disclaimer, the term of this patent is extended or adjusted under 35 U.S.C. 154(b) by 297 days.

(21) Appl. No.: 14/590,601

(22) Filed: Jan. 6, 2015

(65) Prior Publication Data
US 2015/0194923 A1 Jul. 9, 2015

(30) Foreign Application Priority Data
Jan. 8, 2014 (KR) .......................... 10-2014-0002560

(51) Int. Cl.
| | |
|---|---|
| H02J 7/34 | (2006.01) |
| H02S 10/10 | (2014.01) |
| H02N 1/04 | (2006.01) |
| H02J 1/06 | (2006.01) |
| H02N 11/00 | (2006.01) |
| H02J 3/38 | (2006.01) |

(52) U.S. Cl.
CPC .............. *H02S 10/10* (2014.12); *H02J 1/06* (2013.01); *H02N 1/04* (2013.01); *H02N 11/002* (2013.01); *H02J 3/383* (2013.01); *Y02E 10/50* (2013.01); *Y02E 10/563* (2013.01); *Y10T 307/50* (2015.04); *Y10T 307/544* (2015.04); *Y10T 307/615* (2015.04); *Y10T 307/696* (2015.04)

(58) Field of Classification Search
None
See application file for complete search history.

(56) References Cited

U.S. PATENT DOCUMENTS

| | | | | |
|---|---|---|---|---|
| 2002/0194989 | A1* | 12/2002 | Tuma | B01D 53/0415 95/90 |
| 2010/0060231 | A1* | 3/2010 | Trainor | H01G 11/14 320/103 |
| 2011/0204317 | A1* | 8/2011 | Park | B82Y 30/00 257/9 |
| 2012/0292915 | A1* | 11/2012 | Moon | F01D 5/00 290/55 |
| 2013/0257156 | A1* | 10/2013 | Hadimani | H01L 27/301 307/48 |
| 2015/0001966 | A1* | 1/2015 | McCowen | H05F 7/00 307/149 |

* cited by examiner

*Primary Examiner* — Tuan T Lam
(74) *Attorney, Agent, or Firm* — NSIP Law

(57) ABSTRACT

Provided is a hybrid power generating device. The hybrid power generating device includes a solar cell configured to generate an electric energy using sunlight; an electrostatic generating device configured to generate an electric energy using static electricity; and a rectifier configured to electrically connect the electric energy generated by the solar cell to the electric energy generated by the electrostatic generating device.

11 Claims, 3 Drawing Sheets

[Fig 1]
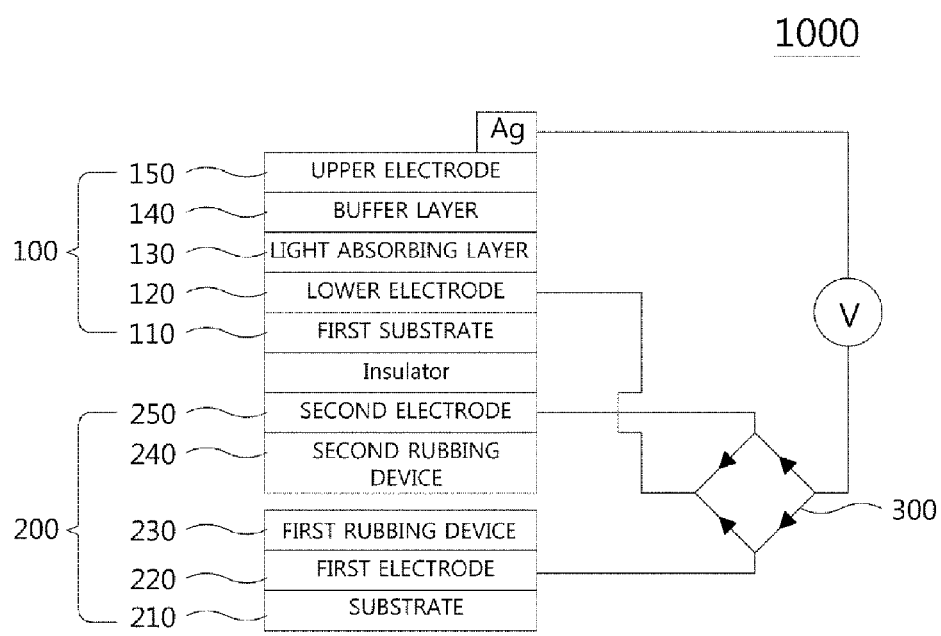

[Fig 2]
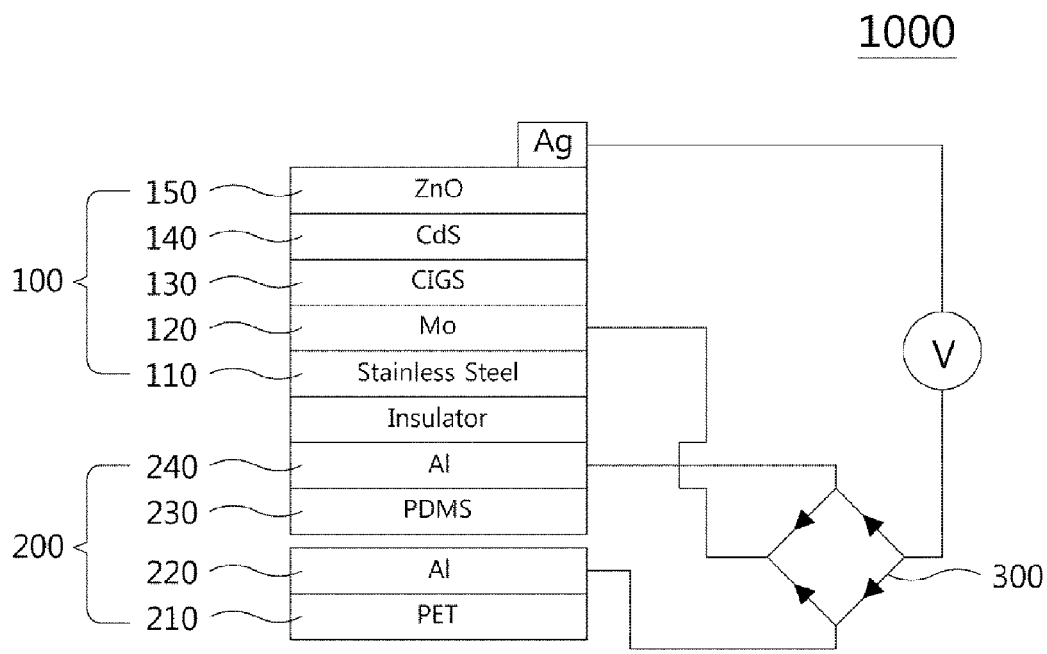
[Fig 3]
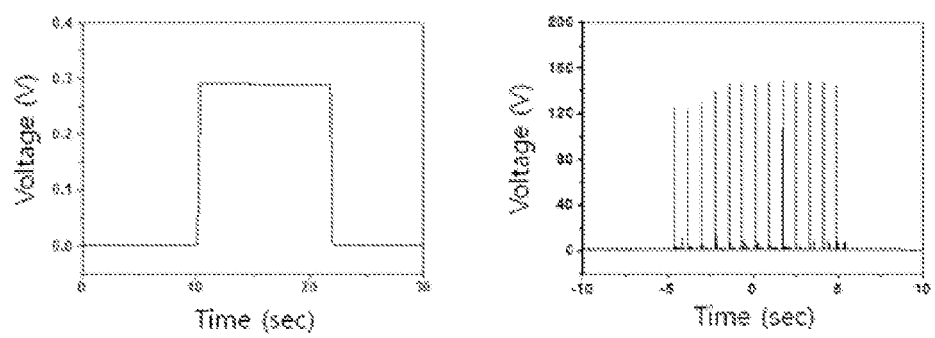

[Fig 4]
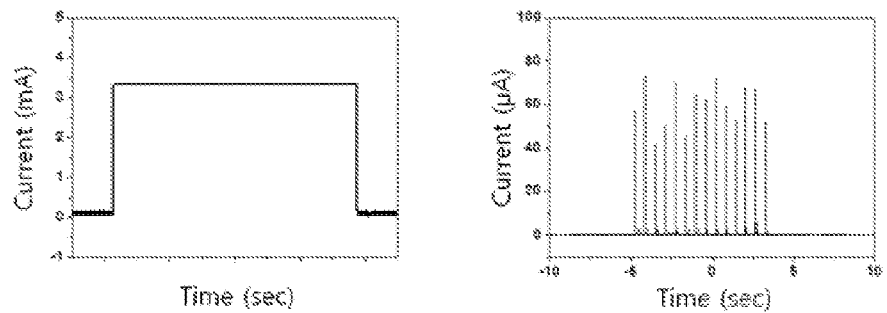
[Fig 5]
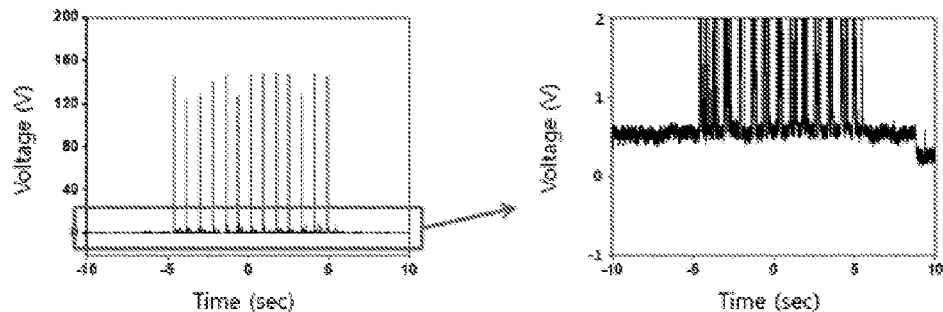
[Fig 6]
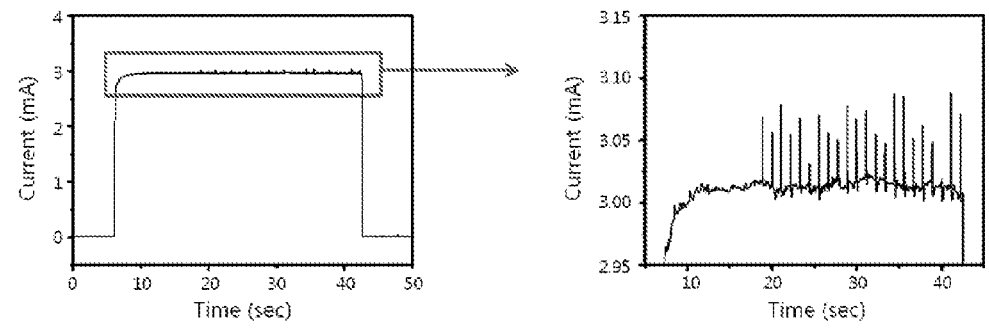

HYBRID POWER GENERATING DEVICE

CROSS-REFERENCE TO RELATED APPLICATION

This application claims the benefit under 35 USC 119(a) of Korean Patent Application No. 10-2014-0002560, filed on Jan. 8, 2014, the entire disclosure of which is incorporated herein by reference for all purposes.

BACKGROUND

1. Field of the Invention

The present invention relates to a hybrid power generating device. More specifically, the present invention relates to a hybrid power generating device including a solar cell which is capable of generating an electric energy using sunlight and an electrostatic generating device which is capable of generating an electric energy using static electricity.

2. Discussion of Related Art

A solar cell is highlighted as an energy generating device using sunlight which is a limitless energy source, but has a limit of theoretical energy transformation efficiency and constraints in space and time. Also, the solar cell has a limit in which the electric energy is not generated at a condition without sunlight (for example, night, cloudy day, and/or the like). In order to overcome the above limitations or restrictions, fusion with a device using an energy source different from the solar cell and a device design thereof are being actively studied.

For example, various studies to overcome the limitations of the solar cell by applying a piezoelectric device to the solar cell are being studied, but the piezoelectric device has an output value much lower than the solar cell, and thus, is not sufficient to compensate for the limitations of the solar cell in an environment in which the solar cell is not operated.

Thus, the inventor of the present invention conceived that an electrostatic phenomenon, which is unnecessary for or interrupts daily life, will be used as a new energy source, and a power generating device using the static electricity, which has not been applied in the related art yet, is applied to the solar cell, and thus, a new power generating device, which solves the limitations of weather and time of the conventional solar cell, is developed.

SUMMARY OF THE INVENTION

The present invention is directed to a hybrid power generating device including a solar cell which is capable of generating an electric energy using sunlight and an electrostatic generating device which is capable of generating an electric energy using static electricity.

One aspect of the present invention provides a hybrid power generating device including a solar cell configured to generate an electric energy using sunlight; an electrostatic generating device configured to generate an electric energy using static electricity; and a rectifier configured to electrically connect the electric energy generated by the solar cell to the electric energy generated by the electrostatic generating device.

In one embodiment, the rectifier may include a bridge rectifier configured to convert an alternating power source supplied by the electrostatic generating device into a direct power source to combine with a direct power source supplied by the solar cell.

In one embodiment, the solar cell may include at least one selected from the group consisting of a silicon solar cell, a composite semiconductor solar cell, an organic solar cell, and a dye sensitized solar cell.

In one embodiment, the solar cell and the electrostatic generating device may be disposed so that sunlight having passed through the electrostatic generating device may be incident into the solar cell.

In one embodiment, the electrostatic generating device may be formed of a transparent material.

In one embodiment, the electrostatic generating device may include a first rubbing device having conductivity; a second rubbing device spaced part from the first rubbing device by a constant distance, formed of a dielectric material, and rubbed against the first rubbing device by an external force; and an electrode configured to face the first rubbing device so that the second rubbing device is interposed therebetween, and contact the second rubbing device.

In one embodiment, the first rubbing device may be disposed adjacent to the solar cell, and the second rubbing device may be spaced apart from the solar cell so that the first rubbing device is interposed therebetween.

The hybrid power generating device according to the embodiment of the present invention may further include an insulating layer interposed between the first rubbing device and the solar cell.

In one embodiment, the electrode may be disposed adjacent to the solar cell, and the first rubbing device may be spaced apart from the solar cell so that the second rubbing device is interposed therebetween.

The hybrid power generating device according to the embodiment of the present invention may further include an insulating layer interposed between the electrode and the solar cell; and a substrate configured to face the second rubbing device so that the first rubbing device is interposed therebetween, support the first rubbing device, and be formed of a plastic material.

In one embodiment, the electrostatic generating device may include a first rubbing device formed of a dielectric material; a second rubbing device spaced part from the first rubbing device by a constant distance, formed of a conductive material, and rubbed against the first rubbing device by an external force; a first electrode configured to face the second rubbing device so that the first rubbing device is interposed therebetween, and contact the first rubbing device; and a second electrode configured to face the first rubbing device so that the second rubbing device is interposed therebetween, and contact the second rubbing device.

In one embodiment, the solar cell and the electrostatic generating device may be disposed so that sunlight having passed through the electrostatic generating device may be incident into the solar cell.

In one embodiment, the electrostatic generating device may include a transparent material.

The hybrid power generating device according to the embodiment of the present invention may further include an insulating layer interposed between the first rubbing device and the solar cell.

BRIEF DESCRIPTION OF THE DRAWINGS

The above and other features and advantages of the present invention will become more apparent to those of ordinary skill in the art by describing in detail exemplary embodiments thereof with reference to the attached drawings in which:

FIG. 1 is a conceptual view illustrating a hybrid power generating device according to an embodiment of the present invention;

FIG. 2 is a conceptual view illustrating a hybrid power generating device according to another embodiment of the present invention;

FIG. 3 is voltage graphs illustrating electric energy individually generated by a solar cell and an electrostatic generating device of the hybrid power generating device according to the embodiment of the present invention;

FIG. 4 is current graphs illustrating electric energy individually generated by the solar cell and the electrostatic generating device of the hybrid power generating device according to the embodiment of the present invention;

FIG. 5 is a voltage graph illustrating electric energy simultaneously generated by the solar cell and the electrostatic generating device of the hybrid power generating device according to the embodiment of the present invention; and FIG. 6 is a current graph illustrating electric energy simultaneously generated by the solar cell and the electrostatic generating device of the hybrid power generating device according to the embodiment of the present invention.

DETAILED DESCRIPTION OF EMBODIMENTS

It is important to understand that the present invention may be embodied in many alternative forms and should not be construed as limited to the example embodiments set forth herein. While the invention is susceptible to various modifications and alternative forms, specific embodiments thereof are shown by way of example in the drawings and will herein be described in detail. It should be understood, however, that there is no intent to limit the invention to the particular forms disclosed, but on the contrary, the invention is to cover all modifications, equivalents, and alternatives falling within the spirit and scope of the invention.

It will be understood that when an element is referred to as being "connected" or "coupled" to another element, it can be directly connected or coupled to the other element or intervening elements may be present. In contrast, when an element is referred to as being "directly connected" or "directly coupled" to another element, there are no intervening elements present. Other words used to describe the relationship between elements should be interpreted in a like fashion (e.g., "between" versus "directly between," "adjacent" versus "directly adjacent," etc.). It will be understood that, although the terms "first," "second," "third," etc. may be used herein to describe various elements, these elements should not be limited by these terms. These terms are used to distinguish one element from another. Thus, a first element discussed below could be termed a second element without departing from the teachings of the present inventive concept. As used herein, the term "and/or" includes any and all combinations of one or more of the associated listed items.

Hereinafter, best modes of the present invention will be explained in detail with reference to the accompanying drawings. In numbering reference numerals to the structural parts of each drawing, like numerals may refer to like elements throughout the description of the figures.

FIG. 1 is a conceptual view illustrating a hybrid power generating device according to an embodiment of the present invention, and FIG. 2 is a conceptual view illustrating a hybrid power generating device according to another embodiment of the present invention.

Referring to FIGS. 1 and 2, a hybrid power generating device 1000 according to the embodiment of the present invention may include a solar cell 100, an electrostatic generating device 200, and a rectifier 300.

Also, the hybrid power generating device 1000 according to the embodiment of the present invention may further include an insulator interposed between the solar cell 100 and the electrostatic generating device 200 to insulate the solar cell 100 from the electrostatic generating device 200.

The solar cell 100 may generate an electric energy using sunlight, and include a first substrate 110, a lower electrode 120, a light absorbing layer 130, a buffer layer 140, and an upper electrode 150. For example, the solar cell 100 may be a CIGS solar cell, but is not be limited thereto, and may be a silicon solar cell, a composite semiconductor solar cell, an organic solar cell, or a dye sensitized solar cell.

Glass or a stainless steel may be used for the first substrate 110. When glass is used for the first substrate 110, the solar cell 100 having a maximum efficiency, generally, may be constructed, but a polymer having flexibility or stainless steel may be used for the first substrate 110 based on an environment or a condition in which the solar cell 100 is used.

The lower electrode 120 may be disposed on the first substrate 110, and formed of a material having a low specific resistance to be used as an electrode. The lower electrode 120 may preferably be formed of a material easily attached to the first substrate 110 based on a material of the first substrate 110.

By the above, the lower electrode 120 has a thermal expansion coefficient different from that of the first substrate 110, and thus, delamination of the first substrate 110 from the lower electrode 120 is prevented.

The light absorbing layer 130 may be disposed on the lower electrode 120, and include copper (Cu), indium (In), gallium (Ga), and selenium (Se).

The buffer layer 140 may be disposed on the light absorbing layer 130, and for example, cadmium sulfide (CdS) may be used for the buffer layer 140. The buffer layer 140 may compensate for a difference of a lattice constant and an energy bandgap between the light absorbing layer 130 and the upper electrode 150, and thus, form a good bond between the light absorbing layer 130 and the upper electrode 150.

The upper electrode 150 may be disposed on the buffer layer 140, and for example, zinc oxide (ZnO) may be used for the upper electrode 150. Zinc oxide is transparent and has a conductive characteristic, and has a transmittance of visible light of 80% or more, and thus, may replace indium tin oxide (ITO) which is used for a conventional solar cell.

Referring to FIGS. 1 and 2, silver (Ag) may be additionally stacked on the upper electrode 150, and thus, the rectifier 300 is easily electrically connected to the upper electrode 150. It is obvious that the stacked material is not limited to silver (Ag) but any material which is capable of easily electrically connecting the rectifier to the upper electrode 150 may be used.

The electrostatic generating device 200 is a device generating an electric energy using static electricity, and may include a substrate 210, a first electrode 220, a first rubbing device 230, a second rubbing device 240, and a second electrode 250.

The substrate 210 may support the first electrode 220, and be formed of a plastic material. A thermoplastic may be used for the substrate 210, and PET may be preferably used.

The first rubbing device 230 and the second rubbing device 240 are formed of materials in which one thereof may be charged as a positive charge and the other may be charged as a negative charge by rubbing against each other. For example, when the first rubbing device 230 includes a dielectric material, the second rubbing device 240 may include a conductive material or a dielectric material. On the contrary, when the second rubbing device 240 includes a dielectric material, the first rubbing device 230 may include a conductive material or a dielectric material.

The first rubbing device 230 and the second rubbing device 240 may be spaced apart from each other by a constant distance. Thus, the first rubbing device 230 and the second rubbing device 240 may be rubbed against each other by a force provided from the outside.

When a power is supplied to the hybrid power generating device 1000 according to the embodiment of the present invention from the outside by sound or wind, the first rubbing device 230 and the second rubbing device 240 may be rubbed against each other. When the first rubbing device 230 and the second rubbing device 240 are rubbed against each other, static electricity may be generated. Types of the power provided from the outside are not limited.

The first rubbing device 230 and the second rubbing device 240 may be formed of a flexible material so as to rub against each other by power of sound or wind.

When the first rubbing device 230 and the second rubbing device 240 are rubbed against each other, one of the first rubbing device 230 and the second rubbing device 240 may be charged with a positive charge (+) and the other may be charged with a negative charge (−).

When the first rubbing device 230 and the second rubbing device 240 are charged with different charges, a voltage difference may be generated between the first rubbing device 230 and the second rubbing device 240, and the electrostatic generating device 200 may generate an electric energy by the generated voltage difference.

For example, when the first rubbing device 230 is charged with the positive charge (+) and the second rubbing device 240 is charged with the negative charge (−) by the rubbing, and the first rubbing device 230 is electrically connected to the second rubbing device 240, the negative charge (−) of the second rubbing device 240 flows toward the first rubbing device 230. Thus, a current flows from the first rubbing device 230 toward the second rubbing device 240. The electrostatic generating device 200 may generate the electric energy through the above principle.

For example, aluminum (Al) may be used for the first rubbing device 230 and transparent PDMS may be used for the second rubbing device 240, but various materials may be used for the first rubbing device 230 and the second rubbing device 240 as long as the static electricity is generated by rubbing the first rubbing device 230 and the second rubbing device 240 against each other.

Further, materials of the first rubbing device 230 and the second rubbing device 240 may be preferably selected to generate maximum static electricity by friction. Thus, the electric energy generated by the electrostatic generating device 200 is increased.

The first electrode 220 may face the second rubbing device 240 so that the first rubbing device 230 is interposed therebetween, and contact the first rubbing device 230. In this case, when the first rubbing device 230 is formed of a conductive material, the first rubbing device 230 may function as the first electrode 220, and thus the first rubbing device 230 may replace the first electrode 220.

When the first rubbing device 230 replaces the first electrode 220, the substrate 210 may support the first rubbing device 230.

The second electrode 250 may face the first rubbing device 230 so that the second rubbing device 240 is interposed therebetween, and contact the second rubbing device 240. In this case, when the second rubbing device 240 formed of a conductive material, the second rubbing device 240 may function as the second electrode 250, and thus, the second rubbing device 240 may replace the second electrode 250.

Although not shown in FIGS. 1 and 2, a support member (not shown) configured to support the first rubbing device 230 may be interposed between the first rubbing device 230 and the second rubbing device 240 so as to be disposed at both ends of the first rubbing device 230 and the second rubbing device 240, and be spaced between the first rubbing device 230 and the second rubbing device 240 by a constant distance.

Also, the first electrode 220 and the first rubbing device 230 may be formed of different materials.

In FIG. 1, the solar cell 100 is disposed on the electrostatic generating device 200, but the electrostatic generating device 200 may be disposed on the solar cell 100.

When the electrostatic generating device 200 is disposed on the solar cell 100, the electrostatic generating device 200 may be formed of a transparent material so that sunlight may pass through the electrostatic generating device 200 and be absorbed by the solar cell 100.

For example, a transparent material, which may generate static electricity by friction, may be used for the first rubbing device 230 and the second rubbing device 240, and a transparent electrode such as ITO may be used for the first electrode 220 and the second electrode 250.

As described in the above, when the first rubbing device 230 is formed of the conductive material, the electrostatic generating device 200 according to another embodiment of the present invention may include a first conductive rubbing device 230, a second rubbing device 240 spaced apart from the first rubbing device 230 by a constant distance, formed of a dielectric material, and rubbed against the first rubbing device 230 by a force provided from the outside, and an electrode facing the first rubbing device 230 so that the second rubbing device 240 is interposed therebetween and contacting the second rubbing device 240.

Further, when the second rubbing device 240 is formed of the conductive material, the electrostatic generating device 200 according to another embodiment of the present invention may include a first rubbing device 230 formed of a dielectric material, a second rubbing device 240 spaced apart from the first rubbing device 230 by a constant distance, formed of a conductive material, and rubbed against the first rubbing device 230 by a force provided from the outside, and an electrode facing the second rubbing device 240 so that the first rubbing device 230 is interposed therebetween and contacting the first rubbing device 230.

The rectifier 300 may electrically connect the electric energy generated by the solar cell 100 to the electric energy generated by the electrostatic generating device 200. The rectifier 300 may convert an alternating current generated by the electrostatic generating device 200 into a direct current, and thus, electrically connect the converted direct current to a direct current generated by the solar cell 100.

For example, the rectifier 300 may include a bridge rectification circuit having a rectification diode which is capable of outputting the same voltage as an input voltage. The bridge rectification circuit may include four diodes and four nodes respectively interposed between the four diodes.

Referring to FIG. 1, the first electrode 220 and the second electrode 250 are electrically connected to the rectifier 300, respectively, and the lower electrode 120 and the upper electrode 150 are electrically connected to the rectifier 300, respectively. In this case, the nodes of the bridge rectification circuit may be individually connected to the lower electrode 120, the upper electrode 150, the first electrode 220, and the second electrode 250.

Referring to FIG. 2, since the first rubbing device 230 includes conductive aluminum, the first rubbing device 230 may replace the first electrode 220 and function as an electrode. Thus, the first rubbing device 230 may be electrically connected to the rectifier 300. In this case, the nodes of the bridge rectification circuit may be individually connected to the lower electrode 120, the upper electrode 150, the first rubbing device 230, and the second electrode 250.

The above hybrid power generating device 1000 according to the embodiment of the present invention may integrate the electric energy of the solar cell and the electric energy of the electrostatic generating device, and thus, a limitation in which the solar cell has a small output voltage may be compensated by the electrostatic generating device having a large output voltage, and a limitation in which the electrostatic generating device has a small output current may be compensated by the solar cell having a large output current, and thus, a synergistic effect may be generated.

FIG. 3 is voltage graphs illustrating electric energy individually generated by a solar cell and an electrostatic generating device of the hybrid power generating device according to the embodiment of the present invention, and FIG. 4 is current graphs illustrating electric energy individually generated by the solar cell and the electrostatic generating device of the hybrid power generating device according to the embodiment of the present invention.

A left graph of FIG. 3 is a voltage graph illustrating a CIGS solar cell that individually generates the electric energy, and a right graph is a voltage graph illustrating the electrostatic generating device that individually generates the electric energy.

A left graph of FIG. 4 is a current graph illustrating the CIGS solar cell that individually generates the electric energy, and a right graph is a current graph illustrating the electrostatic generating device that individually generates the electric energy.

Referring to FIGS. 3 and 4, the voltage generated from the CIGS solar cell by irradiation of the sunlight is about 0.26 V, and the current thereof is about 3.3 mA. Thus, the electric energy generated by the CIGS solar cell is about 853 µW.

The voltage generated from the electrostatic generating device by the static electricity by rubbing is in a range of about 120 to 140 V, and the current thereof is in a range of about 40 to 77 µA. Thus, the electric energy generated by the electrostatic generating device is in a range of about 4,800 to 10,780 µW.

FIG. 5 is a voltage graph illustrating electric energy simultaneously generated by the solar cell and the electrostatic generating device of the hybrid power generating device according to the embodiment of the present invention. A right graph of FIG. 5 is an enlarged view of a portion displayed as a block in a left graph of FIG. 5.

Referring to FIG. 5, the voltage of the hybrid power generating device according to the embodiment of the present invention is a composite value of the voltages of both the CIGS solar cell and the electrostatic generating device. The integrated voltage is in a range of about 120.26 to 140.26 V.

FIG. 6 is a current graph illustrating electric energy simultaneously generated by the solar cell and the electrostatic generating device of the hybrid power generating device according to the embodiment of the present invention. A right graph of FIG. 6 is an enlarged view of a portion displayed by a block in a left graph of FIG. 6.

Referring to FIG. 6, the current of the hybrid power generating device according to the embodiment of the present invention is a composite value of the voltages of both the CIGS solar cell and the electrostatic generating device. The integrated current is in a range of about 3,340 to 3,377 µA.

As described above, when the solar cell and the electrostatic generating device of the hybrid power generating device 1000 according to the embodiment of the present invention simultaneously generate the electric energy, the electric energy having the maximum value of 11,633 µW is generated, and thus, the amount of the generated electric energy is greatly increased compared with an individually used solar cell and electrostatic generating device.

According to the present invention, an electrostatic generating device generates an electric energy in an environment, in which sunlight does not exist and a solar cell may not generate an electric energy, when energy by sound or wind is supplied, and thus, limitations of a solar cell may be overcome and efficiency may be increased.

The solar cell of the present invention may generate the electric energy using sunlight, and the electrostatic generating device may generate an electric energy using energy such as sound or wind, and thus, eco-friendly electric energy may be generated.

In the present invention, the electrostatic generating device generates the electric energy in the environment in which the solar cell may not generate the electric energy, and the solar cell may generate the electric energy in an opposite case thereto.

Further, a limitation in which the solar cell has a small output voltage may be compensated by the electrostatic generating device having a great output voltage, and a limitation in which the electrostatic generating device has a small output current may be compensated by the solar cell having a great output current, and thus, a synergistic effect may be generated.

The present invention has been explained with reference to the exemplary embodiments, however, it will be apparent to those skilled in the art that various modifications can be made to the above-described exemplary embodiments of the present invention without departing from the spirit or scope of the invention. Here, the essential technical scope of the present invention is disclosed in the appended claims, and it is intended that the present invention cover all such modifications provided they come within the scope of the claims and their equivalents.

What is claimed is:
1. A hybrid power generating device, comprising:
a solar cell configured to generate electric energy using sunlight;
an electrostatic generating device configured to generate electric energy using static electricity; and
a rectifier configured to electrically connect the electric energy generated by the solar cell to the electric energy generated by the electrostatic generating device,
wherein the electrostatic generating device comprises:
a first rubbing device having conductivity;
a second rubbing device spaced apart from the first rubbing device by a constant distance, formed of a dielectric material, and configured to rub against the first rubbing device in response to an external force; and
an electrode configured to face the first rubbing device so that the second rubbing device is interposed between the electrode and the first rubbing device, and contact the second rubbing device, wherein the electrode is disposed adjacent to the solar cell, and wherein the first rubbing device is spaced apart from the solar cell so that the second rubbing device is interposed between the first rubbing device and the solar cell.

2. The hybrid power generating device of claim 1, wherein the rectifier comprises a bridge rectifier configured to convert an alternating power source supplied by the electrostatic generating device into a direct power source to combine with a direct power source supplied by the solar cell.

3. The hybrid power generating device of claim 1, wherein the solar cell comprises at least one selected from the group consisting of a silicon solar cell, a composite semiconductor solar cell, an organic solar cell, and a dye sensitized solar cell.

4. The hybrid power generating device of claim 1, wherein the solar cell and the electrostatic generating device are disposed so that sunlight passing through the electrostatic generating device is incident into the solar cell.

5. The hybrid power generating device of claim 4, wherein the electrostatic generating device is formed of a transparent material.

6. A hybrid power generating device, comprising:
a solar cell configured to generate electric energy using sunlight;
an electrostatic generating device configured to generate electric energy using static electricity; and
a rectifier configured to electrically connect the electric energy generated by the solar cell to the electric energy generated by the electrostatic generating device,
wherein the electrostatic generating device comprises:
a first rubbing device having conductivity;
a second rubbing device spaced apart from the first rubbing device by a constant distance, formed of a dielectric material, and configured to rub against the first rubbing device in response to an external force; and
an electrode configured to face the first rubbing device so that the second rubbing device is interposed between the electrode and the first rubbing device, and contact the second rubbing device.

7. The hybrid power generating device of claim 6, further comprising:
an insulating layer interposed between the electrode and the solar cell; and
a substrate configured to face the second rubbing device so that the first rubbing device is interposed between the substrate and the second rubbing device, and support the first rubbing device, wherein the substrate is formed of a plastic material.

8. A hybrid power generating device, comprising:
a solar cell configured to generate electric energy using sunlight;
an electrostatic generating device configured to generate electric energy using static electricity; and
a rectifier configured to electrically connect the electric energy generated by the solar cell to the electric energy generated by the electrostatic generating device,
wherein the electrostatic generating device comprises:
a first rubbing device formed of a dielectric material;
a second rubbing device spaced apart from the first rubbing device by a constant distance, formed of a conductive material, and configured to rub against the first rubbing device in response to an external force;
a first electrode configured to face the second rubbing device so that the first rubbing device is interposed between the first electrode and the second rubbing device, and contact the first rubbing device; and
a second electrode configured to face the first rubbing device so that the second rubbing device is interposed between the second electrode and the first rubbing device, and contact the second rubbing device.

9. The hybrid power generating device of claim 8, wherein the solar cell and the electrostatic generating device are disposed so that sunlight passing through the electrostatic generating device is incident into the solar cell.

10. The hybrid power generating device of claim 9, wherein the electrostatic generating device is formed of a transparent material.

11. The hybrid power generating device of claim 10, further comprising an insulating layer interposed between the first rubbing device and the solar cell.

* * * * *